Dec. 30, 1958 F. J. DEDRICK 2,866,293
SWIVELS
Filed Dec. 7, 1956
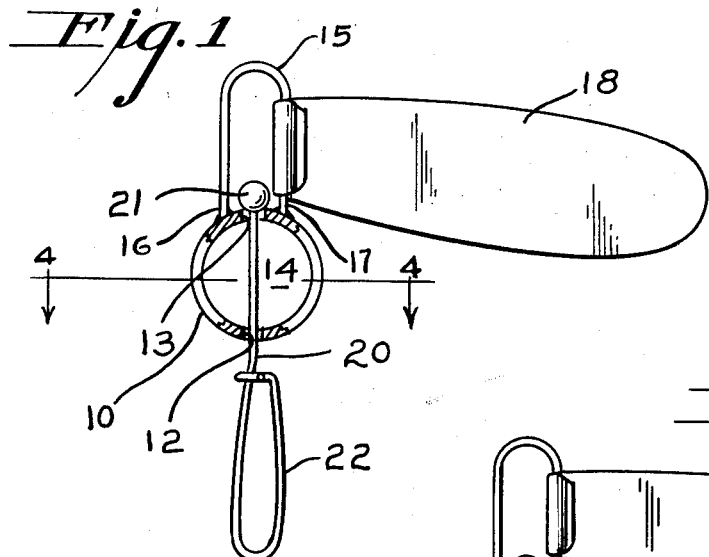
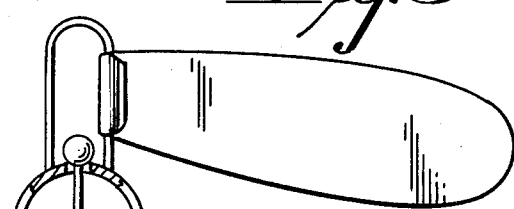
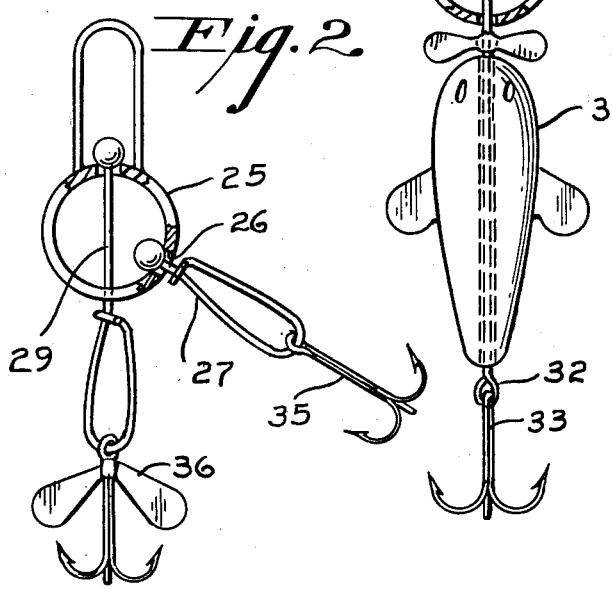
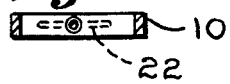
INVENTOR.
FRANCIS J. DEDRICK
BY Vance E. Hoffman
ATTORNEY

United States Patent Office 2,866,293
Patented Dec. 30, 1958

2,866,293

SWIVELS

Francis J. Dedrick, Corning, N. Y.

Application December 7, 1956, Serial No. 627,055

5 Claims. (Cl. 43—43.13)

The present invention relates to swivels, and more particularly to swivels having extremely low friction and therefore especially suited for use with fishing tackle. Many attempts have been made in the past to devise swivels that were sufficiently friction free to positively prevent a line from twisting, as an artificial bait is being drawn through the water. So far as applicant is aware all such devices fail to function effectively when submerged, owing to the added friction imparted thereto when surrounded by water.

According to the present invention there is provided a swivel embodying a bait retaining pin passing through aligned apertures extending transversely through the bore of an annulus and having a ball thrust or other form of spherical surface bearing in substantially line contact with that portion of the annulus bordering the outer end of one of such apertures; the annulus surface bordering the other aperture serving as a lateral guide bearing for the pin. Moreover, such annulus is provided with a bail for attachment of the fish line, but which may if desired be utilized for the attachment thereto of a stabilizer to aid the swivel in positively preventing twisting of the line irrespective of the extent of pull and twisting torque imparted to the swivel by a bait.

For a better understanding of the invention reference is made to the accompanying drawing wherein:

Fig. 1 is a view, partly in section, of one form of swivel embodying the invention.

Fig. 2 is a similar view of an alternative form of swivel.

Fig. 3 is a similar view of a third form of the invention.

Fig. 4 is a view taken on line 4—4 of Fig. 1.

Referring to the Fig. 1 of the drawing in detail, there is provided a circular annulus such as 10 having aligned apertures 12 and 13 passing transversely through the annulus passage 14. A bail 15 bridges the outer end of aperture 13 and has its ends 16 and 17 suitably secured to the annulus 10, as by brazing, for example. A stabilizer 18 is conveniently anchored at one leg to the bail 15, as by folding the end of the stabilizer thereover, as shown. A tackle carrying pin 20 passes through apertures 12 and 13 and at the end bridged by the bail 15 is provided with a head 21 having a spherical surface in substantial line contact with the associated outer end region of the aperture bordering portion of the annulus. The large diameter of aperture 13 and the spherical line contact of the head 21 with the outer end of the aperture bordering wall produces a thrust bearing having less friction than any heretofore known fishing tackle swivel. The opposite end of pin 20 may have the usual safety pin clip 22 for the attachment of tackle thereto. As will be understood provision of the stabilizer 18 is optional.

In an alternative form of the invention shown in Fig. 2 the stabilizer is omitted and the annulus 25 is provided with a third aperture 26 having a pin 27 swiveled therein to accommodate a tackle 35 or the like, which will further aid in the prevention of a tackle, such as 36 for example, from twisting the line.

The form of the invention illustrated in Fig. 3 is substantially the same as that shown in Fig. 1, but the swivel pin 30 instead of being provided with a safety pin clip, such pin passes through an artificial bait 31 and then terminates in an eyelet 32 from which a cluster of hooks 33 project.

What is claimed is:

1. In a swivel, an annulus having aligned apertures passing transversely therethrough and having a bail on the outer surface thereof bridging one of said apertures, a pin passing through said apertures, said pin having a head provided with a spherical surface positioned in line contact with the aperture bordering portion of said annulus bridged by said bail.

2. In a swivel such as defined by claim 1, a stabilizer anchored to said bail and extending outwardly therefrom in a plane normal to the axis of said pin.

3. In a swivel such as defined by claim 2, wherein the end of the pin opposite to the headed end is embodied in an artificial bait structure.

4. In a swivel coupling, an annulus having aligned apertures therethrough normal to the bore passage thereof and having a bail on the outer surface thereof bridging one of said apertures and having its ends attached to said annulus, a stem passing through said apertures, a loop formed on the end of said stem issuing from that of the apertures remote from said bail, and a head arranged at the opposite end of said stem having a spherical surface in line contact with the margin of said annulus surrounding the adjacent end of the associated aperture when a pulling force is exerted between said bail and said loop.

5. In a swivel such as defined by claim 4, a stabilizer element associated with said annulus and bail and projecting in a plane normal to the axis of said stem.

References Cited in the file of this patent

UNITED STATES PATENTS

| 1,265,778 | Hartline | May 14, 1918 |

FOREIGN PATENTS

| 1,135 | Great Britain | 1889 |